United States Patent [19]
Gale

[11] Patent Number: 5,160,176
[45] Date of Patent: Nov. 3, 1992

[54] METAL SEAL BALL JOINT COUPLING ASSEMBLY

[75] Inventor: Edwin J. Gale, Aurora, Colo.

[73] Assignee: Stanley Aviation Corporation, Aurora, Colo.

[21] Appl. No.: 793,578

[22] Filed: Nov. 18, 1991

[51] Int. Cl.$^5$ .............................................. F16L 15/02
[52] U.S. Cl. ................................. 285/165; 285/261; 285/340; 285/917; 285/330
[58] Field of Search ............... 285/261, 271, 917, 340, 285/165, 330

[56] References Cited

U.S. PATENT DOCUMENTS

| | | | |
|---|---|---|---|
| 2,112,352 | 3/1938 | Vetrano . | |
| 2,511,495 | 6/1950 | Crot | 285/261 X |
| 3,334,926 | 8/1967 | Faccou | 285/261 X |
| 3,361,450 | 1/1968 | Franck | 285/271 |
| 3,625,552 | 12/1971 | Mahoff . | |
| 3,891,246 | 6/1975 | Hopper . | |
| 4,318,548 | 3/1982 | Oberle et al. . | |
| 4,395,049 | 7/1983 | Schertler | 285/917 X |
| 4,427,218 | 1/1984 | Duvet et al. . | |
| 4,438,959 | 3/1984 | Valentine . | |
| 4,478,439 | 10/1984 | Arnold . | |
| 4,522,433 | 6/1985 | Valentine et al. . | |
| 4,618,170 | 10/1986 | Fishburne . | |
| 4,696,494 | 9/1987 | Schmitz et al. . | |
| 4,747,622 | 5/1988 | Weinhold . | |
| 4,779,901 | 10/1988 | Halling | 285/917 X |

Primary Examiner—Dave W. Arola
Attorney, Agent, or Firm—Fields, Lewis, Pittenger & Rost

[57] ABSTRACT

In accordance with this invention, an adjustable coupling device for releasably interconnecting confronting ends of first and second fluid carrying conduits is provided. A bell flange is attached to the confronting end of one of the conduits. This bell flange has an arcuate internal sealing surface adjacent the lip thereof and a recess extending inwardly longitudinally from the arcuate sealing surface. A sealing flange is attached to the confronting end of the other of the conduits and is sized to be received within the bell flange. It also includes a peripheral abutment spaced from the outer end thereof. A sleeve is mounted on the end of the sealing flange and has a curved outer surface and an inner surface engageable with the abutment to limit the inward movement thereof. A sealing ring is mounted on the sealing flange adjacent the sleeve and is engageable with the arcuate sealing surface of the bell flange when the flanges are drawn together. A nut is provided on the sealing flange and is slidably connectable to the bell flange. The nut has a curved inner surface engageable with the curved outer surface of the sleeve to allow an angular adjustment of the axes of the conduits at the coupling device. The sleeve is longitudinally adjustable along the sealing flange from the outer end thereof to the abutment. The sealing ring maintains a positive seal regardless of the angular or longitudinal adjustment of the coupling.

6 Claims, 3 Drawing Sheets

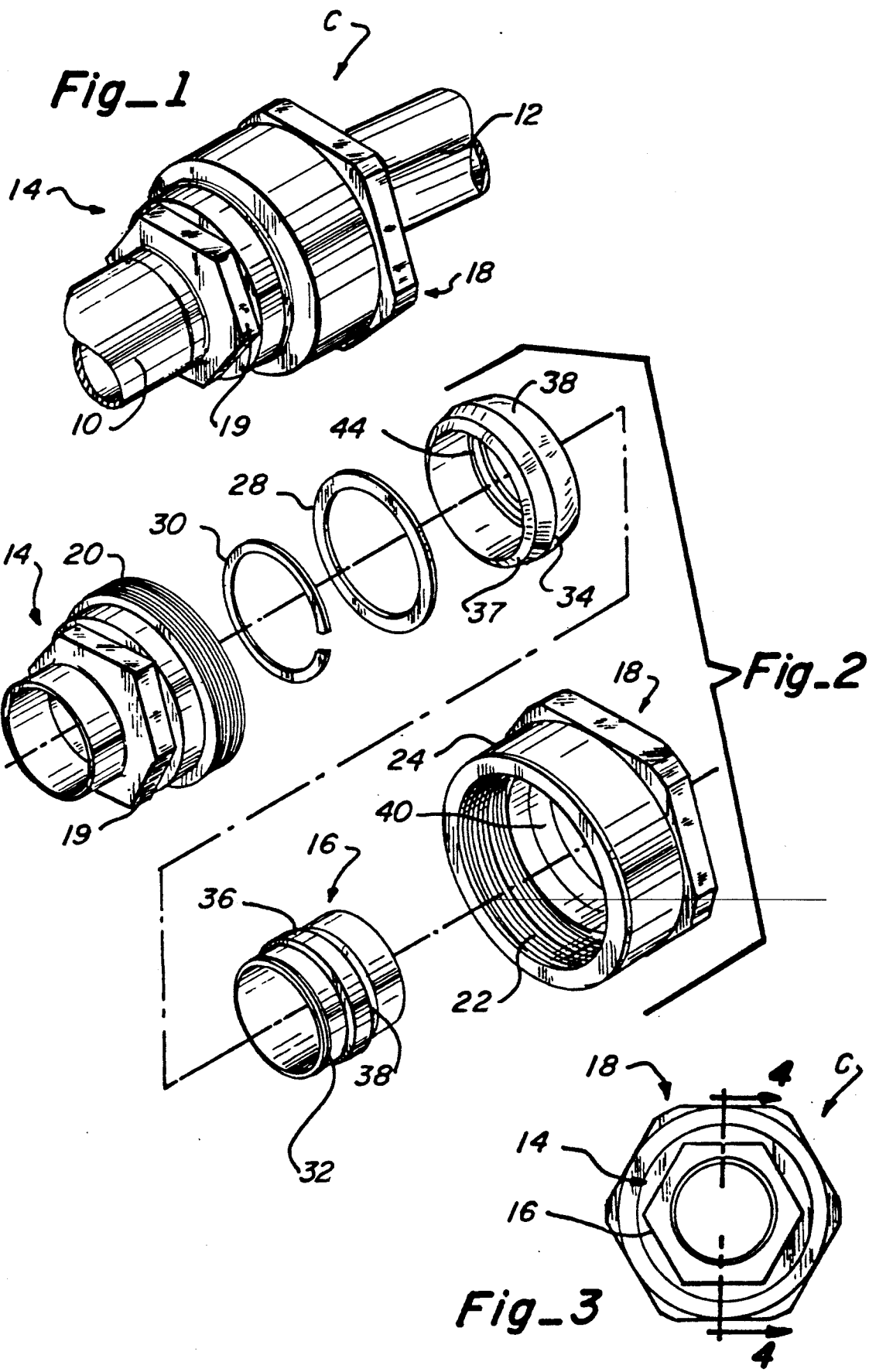

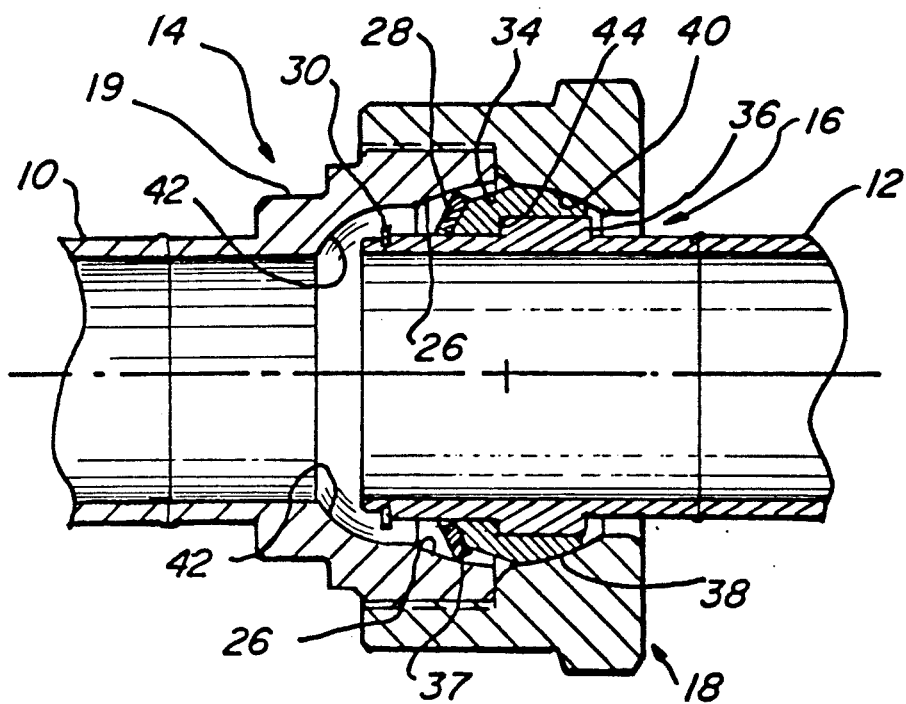
Fig_4
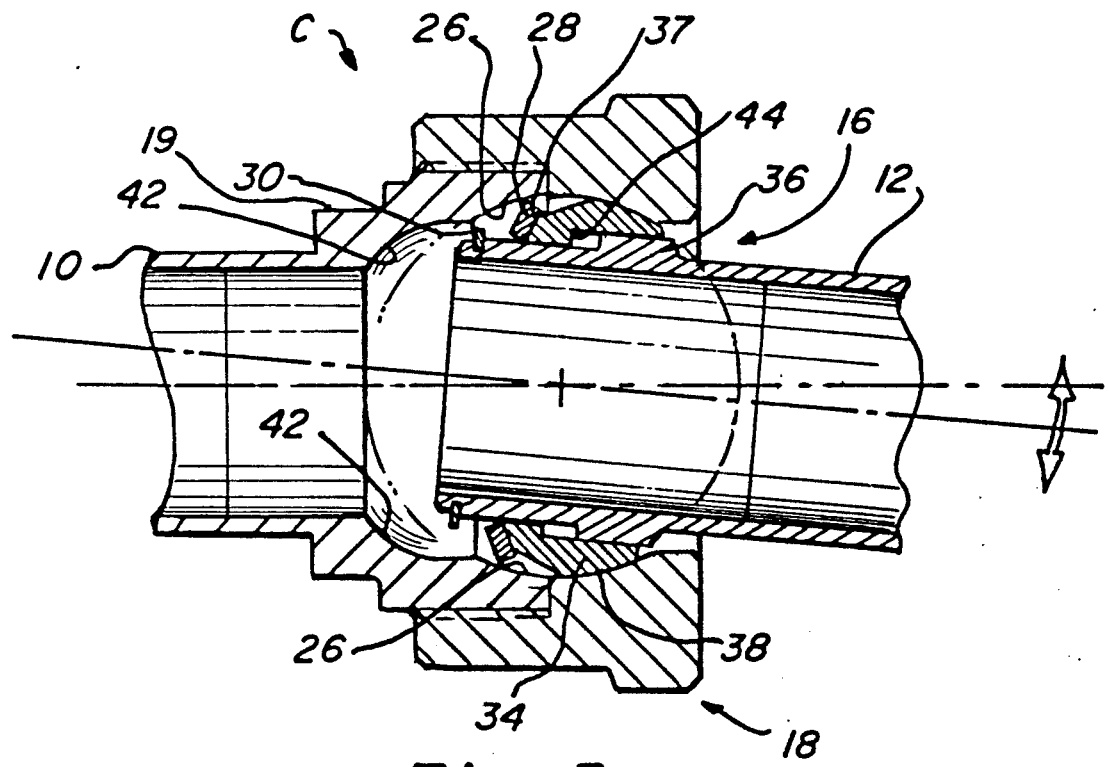
Fig_5

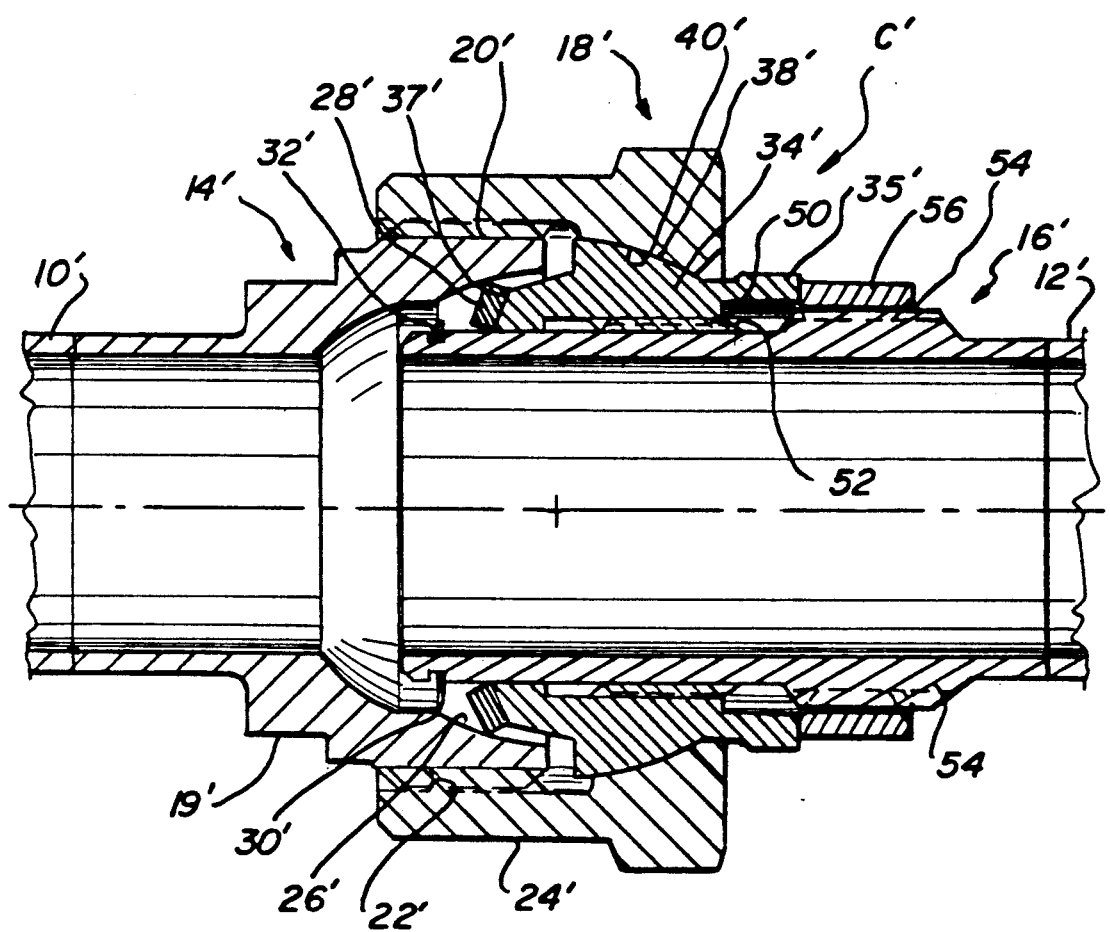
Fig_6

METAL SEAL BALL JOINT COUPLING ASSEMBLY

FIELD OF THE INVENTION

This invention relates to a joint between two fluid conduits and more importantly to a joint which is pivotal from a center axes and longitudinally adjustable.

BACKGROUND ART

A serious problem is encountered in the assembly of various tubings and couplings making up a fluid system, particularly within an aircraft. When the assembler reaches the last coupling, the differences in tolerances are such that they tend to build up. When this occurs it is difficult, if not impossible, to install the last coupling. Thus, the last coupling must have some adjustability to accommodate this build up in tolerances. Prior art attempts to solve this problem are discussed below.

U.S. Pat. No. 2,112,352 to Vetrano discloses a coupling having a sealing ring with tapered faces. There is no angular orientation provided.

U.S. Pat. No. 3,625,552 to Mahoff et al. discloses a coupling having a seal member placed between a pair of flanges. A slight longitudinal adjustment may be possible between coupled members as they are drawn together. There is no angular orientation provided.

U.S. Pat. No. 3,891,246 to Hopper discloses a coupling having a tapered inner surface on one member and a complementary convex outer surface on the other member. Angular orientation between the coupled members is provided. A longitudinal adjustment is not provided.

U.S. Pat. No. 4,318,548 to Oberle et al. discloses a coupling having a convex ring and a complementary concave ring located between the coupled members. Angular orientation between the coupled members is provided. A longitudinal adjustment is not provided.

U.S. Pat. No. 4,427,218 to Duvet et al. discloses a coupling having an annular piece and a complementary frustoconical portion. This arrangement allows angular orientation. A longitudinal adjustment also is possible between the coupled members. This structure is quite complex and does not provide a positive seal between the parts for preventing leakage of high pressure fluids.

U.S. Pat. No. 4,438,959 to Valentine discloses a coupling having a seal ring located between a tubular adapter and female housing. A longitudinal adjustment is permitted between the adapter and the housing. No angular orientation is provided.

U.S. Pat. No. 4,478,439 to Arnold discloses a pair of deflectable seal rings which are located between coupled members. A slight longitudinal adjustment is possible between the coupled members as they are drawn together. No angular orientation is provided.

U.S. Pat. No. 4,522,433 to Valentine et al. shows a spherical seat flexible O-ring coupling which provides both angular and longitudinal adjustment. However, this device requires a separate coupling sleeves to connect the ends of two conduits together.

U.S. Pat. No. 4,618,170 to Fishburne shows coupling devices in which complementary convex and concave sealing surfaces of a male member and female member, respectively, provide a seal and permit an angular orientation between the coupled members. A longitudinal adjustment is not provided.

U.S. Pat. No. 4,696,494 to Schmitz et al. discloses a coupling having complementary curved surfaces on members that are coupled which permit angular orientation. There is no longitudinal adjustment provided.

U.S. Pat. No. 4,747,622 to Weinhold discloses a coupling having complementary curved surfaces between members to be coupled which permit an angular orientation between the coupled members. No longitudinal adjustment is provided.

DISCLOSURE OF THE INVENTION

In accordance with this invention, an adjustable coupling device for releasably interconnecting confronting ends of first and second fluid carrying conduits is provided. A bell flange is attached to the confronting end of one of the conduits. This bell flange has an arcuate internal sealing surface adjacent the lip thereof and a recess extending inwardly longitudinally from the arcuate sealing surface. A sealing flange is attached to the confronting end of the other of the conduits and is sized to be received within the bell flange. It also includes a peripheral abutment spaced from the outer end thereof. A sleeve is mounted on the end of the sealing flange and has a curved outer surface and an inner surface engageable with the abutment to limit the inward movement thereof. A sealing ring is mounted on the sealing flange adjacent the sleeve and is engageable with the arcuate sealing surface of the bell flange when the flanges are drawn together. A nut is provided on the sealing flange and is slidably connectable to the bell flange. The nut has a curved inner surface engageable with the curved outer surface of the sleeve to allow an angular adjustment of the axes of the conduits at the coupling device. The sleeve is longitudinally adjustable along the sealing flange from the outer end thereof to the abutment.

More particularly, the outer surface of the sleeve is spherical and the inner surface of the nut spherical. The recess and the bell flange also has a spherical surface.

With this arrangement, a simple coupling device is provided for use in fluid pressurized conduits wherein both longitudinal and lateral adjustment is provided, while maintaining a positive seal, to compensate for the buildup in tolerances in fluid conduit assembly, particularly in installations where close tolerances are required, such as in aircraft. This positive seal is maintained regardless of the angular or longitudinal adjustment made in the coupling.

Additional advantages of this invention will become apparent from the description which follows, taken in conjunction with the accompanying drawings.

BRIEF DESCRIPTION OF THE DRAWINGS

FIG. 1 is a perspective view of the ball joint coupling assembly of this invention;

FIG. 2 is an exploded view of the coupling of FIG. 1;

FIG. 3 is an end view of the coupling of FIG. 1;

FIG. 4 is an enlarged longitudinal section, taken along line 4—4 of FIG. 3, showing the coupling assembly when the conduits are axially aligned;

FIG. 5 is a vertical section, similar to FIG. 4, but showing the coupling assembly when the conduits are angularly displaced with respect to each other and are longitudinally displaced; and FIG. 6 is a longitudinal section of an alternative embodiment of a coupling constructed in accordance with this invention.

BEST MODE FOR CARRYING OUT THE INVENTION

In accordance with this invention, a threaded coupling C is provided for interconnecting confronting ends of fluid-carrying tubes or conduits 10 and 12. The conduit is formed integrally or attached, as by welding, to the confronting end of bell flange 14. The other conduit 12 is integrally formed with or attached, as by welding, to the confronting end of sealing flange 16 which is held in place against bell flange 14, as by nut 18.

On the exterior of bell flange 14 opposite its lip is an integrally formed hexagonal portion 19 to which a wrench can be applied for tightening the coupling. Also the bell flange is provided with external threads 20 for mating with the internal threads 22 within collar 24 of nut 18.

Internally, bell flange 14 has a first arcuate surface, such as spherical surface 26 against which sealing ring 28 of sealing flange 16 bears. Sealing ring 28 is held in position on the distal inner end of sealing flange 16 by a snap ring 30 which is held in a groove 32 of the sealing flange.

A sleeve 34 is mounted on sealing flange 16 and is slidable therealong between abutment 36 on sealing flange 16 and sealing ring 28 when it is against, snap ring 30. Prior to assembly, sealing ring 28 is flat. During assembly it is forced against conical surface 37 of sleeve 34 and assumes a conical shape. This causes the edges of sealing ring 28 to dig into spherical surface 26 and the surface of sealing flange 16, as shown. Conveniently, the outer surface of sleeve 34 is provided with a spherical surface 38 which bears against the internal spherical surface 40 of nut 18. Thus, conduit 12 can be moved from the axially aligned position with conduit 10 shown in FIG. 4 to an angular position, as shown in FIG. 5. To accomplish this movement an annular recess 42 is provided to accommodate the swinging motion of the end of sealing flange 16.

In addition, longitudinal adjustment can be provided. The sealing flange coupling 16 can move from the position shown in FIG. 4 wherein abutment 36 bears against the internal flat or surface 44 of ring 34 to a position wherein they are longitudinally separated as shown in FIG. 5 to provide longitudinal adjustment within the coupling.

It will be apparent that even with both the lateral and longitudinal adjustment a positive seal is provided by sealing ring in all adjusted positions of the coupling C.

In accordance with an alternative form of this invention, a threaded coupling C' is provided for interconnecting the confronting ends of fluid-carrying tubes or conduits 10' and 12'. The conduit is formed integrally or attached, as by welding to the confronting end of bell flange 14'. The other conduit 12' is integrally formed or attached, as by welding, to the confronting end of sealing flange 16' which is held in place against bell flange 14', as by nut 18'.

On the exterior of bell flange 14' opposite its lip is an integrally formed hexagonal portion 19' to which a wrench can be applied for tightening the coupling. Also, the bell flange is provided with external threads 20' for mating with internal threads 22' within collar 24' of nut 18'.

Internally, bell flange 14' has a first arcuate surface, such as spherical surface 26' against which sealing ring 28' of sealing flange 16' bears. Sealing ring 28' is held in position on the distal inner end of sealing flange 16' by a snap ring 30' which is held in a groove 32' of the sealing flange.

A sleeve 34' is mounted on sealing flange 16' and is adjustable thereon by means of hexagonal portion 35', to which a wrench may be applied to rotate it. This rotation causes internal threads 50 within sleeve 34' to move along external threads intermediate the ends of sealing flange 16'. Similarly, sealing flange 16' has external threads 54 which mate with internal threads of locking nut 56. Thus, sleeve 34' is movable along sealing flange 16' between the abutment formed by external threads 54 and sealing ring 28' when it is against snap ring 30'. As stated with respect to the previous embodiment, sealing ring 28' is flat prior to assembly. During assembly it is forced against conical surface 37' of sleeve 34' and assumes a conical shape. This causes the edges of sealing ring 28' to dig into spherical surface 26' and the surface of sealing flange 16', as shown. Conveniently, sleeve 34' is provided with a spherical surface 38' which bears against the internal spherical surface 40' of nut 18'. This allows conduit 12' to be moved from the axially aligned position with conduit 10' as shown, to an angular position. To accommodate this movement, an annular recess 42' is provided to accommodate the swinging motion of the end of sealing flange 16'. Thus, by the means described, the joint can be moved longitudinally and angularly to accommodate the space limitations, particularly during assembly of the last coupling in a series. This permits adjustments which will compensate for tolerance build-ups along the hydraulic system.

This invention has been described in detail with reference to particular embodiments thereof, but it will be understood that various other modifications can be effected within the spirit and scope of this invention.

I claim:

1. An adjustable coupling device for releasably interconnecting confronting ends of first and second fluid carrying conduits, said device comprising:

a bell flange attached to the confronting end of one of said conduits, said bell flange having a lip and an arcuate, internal sealing surface adjacent said lip and a recess extending inward longitudinally from said arcuate sealing surface;

a sealing flange, having an inner end and an outer end, attached to the confronting end of the other of said conduits which is sized to be received within said bell flange and has an outer surface with a peripheral abutment spaced from said inner end thereof;

a sleeve mounted on the end of said sealing flange and having a curved outer surface facing toward said outer end of said sealing flange and an inner surface engageable with said abutment to limit the inward movement thereof;

a normally flat sealing ring mounted on said sealing flange adjacent said sleeve and having peripheral edges engageable with said arcuate sealing surface of said bell flange and said surface of said sealing flange when said flanges are drawn together; and an abutment means adjacent said inner end of said sealing flange for preventing removal of said sealing ring and said sleeve therefrom;

a nut on said sealing flange threadably connected to said bell flange, said nut having a curved inner surface facing toward said inner end of said sealing flange and engageable with said curved outer surface of said sleeve to urge said peripheral edges into said sealing engagement and to prevent outward movement of said sleeve and to allow an angular adjustment of the axes of the conduits at said coupling device, said sleeve, bell flange, nut and sealing ring being longitudinally adjustable along said sealing flange from a position where said inner surface engages said abutment to a position where said sealing ring engages said abutment means.

2. Apparatus, as claimed in claim 1, wherein:
said outer surface of said sleeve is spherical; and said inner surface of said nut is spherical.

3. Apparatus, as claimed in claim 1, wherein:
said recess in said bell flange has a spherical surface.

4. Apparatus, as claimed in claim 1, wherein said abutment means on said sealing flange includes a peripheral groove adjacent said inner end thereof and further includes:

a snap ring in said groove to retain said sealing ring and said sleeve on said sealing flange.

5. Apparatus, as claimed in claim 1, wherein:
said sleeve has a conical surface; and
said sealing flange is normally flat but is deflected by said conical surface into a conical shape so that said peripheral edge thereof tends to dig into said arcuate sealing surface.

6. Apparatus, as claimed in claim 1, wherein:
said abutment comprises external threads on said ceiling flange; and
said sleeve has a collar overlying said external threads, said sleeve being provided with internal threads which mate with the said external threads of said sealing flange so that rotation of said sleeve with respect to said sealing flange causes longitudinal adjustment of said sleeve along said sealing flange.

* * * * *